(12) United States Patent
Forck

(10) Patent No.: US 9,636,976 B2
(45) Date of Patent: May 2, 2017

(54) SOFT WINDOW STORAGE UNIT AND METHOD

(71) Applicant: Kcrof Enterprises, LLC, Cedar Rapids, IA (US)

(72) Inventor: John Michael Forck, Cedar Rapids, IA (US)

(73) Assignee: Kcrof Enterprises, LLC, Cedar Rapids, IA (US)

( * ) Notice: Subject to any disclaimer, the term of this patent is extended or adjusted under 35 U.S.C. 154(b) by 78 days.

(21) Appl. No.: 14/844,125

(22) Filed: Sep. 3, 2015

(65) Prior Publication Data

US 2016/0075215 A1 Mar. 17, 2016

Related U.S. Application Data

(60) Provisional application No. 62/050,581, filed on Sep. 15, 2014.

(51) Int. Cl.
*B60J 1/08* (2006.01)
*B60J 7/12* (2006.01)
(Continued)

(52) U.S. Cl.
CPC ............... *B60J 1/085* (2013.01); *B60J 1/14* (2013.01); *B60J 1/20* (2013.01); *B60J 7/1291* (2013.01); *B60J 7/201* (2013.01)

(58) Field of Classification Search
CPC . B60J 1/085; B60J 7/1291; B60J 7/201; B60J 7/20; B60J 7/1286
(Continued)

(56) References Cited

U.S. PATENT DOCUMENTS 4,732,421 A * 3/1988 Ross .................. B60J 11/02
150/166
5,078,330 A 1/1992 Hall
(Continued)

FOREIGN PATENT DOCUMENTS

JP 06106991 A 4/1994

OTHER PUBLICATIONS

English translation (machine) of JP06106991A, Apr. 19, 1994, entitled "Window Attaching Structure for Convertible Car", 5 pages.

*Primary Examiner* — Jason S Morrow
(74) *Attorney, Agent, or Firm* — Griffith Bates Champion & Harper LLP; Shannon W. Bates

(57) ABSTRACT

A soft window storage unit may comprise a fabric storage roller and a window storage roller mounted to a base or built into a vehicle. A soft fabric may be coupled to and wrapped around the fabric storage roller. A method of storing a soft window of a vehicle may include unrolling a length of fabric from a fabric storage roller and wrapping at least a portion of the length of fabric onto a window storage roller; then wrapping a soft window around the window storage roller while wrapping the fabric around the window storage roller. The method may further include wrapping the soft window between layers of fabric into the window storage roller. The method may further include removing the soft window from storage by wrapping the fabric back onto the fabric storage roller while simultaneously unwrapping the fabric and the soft window from the window storage roller.

20 Claims, 5 Drawing Sheets

(51) Int. Cl.
*B60J 7/20* (2006.01)
*B60J 1/14* (2006.01)
*B60J 1/20* (2006.01)

(58) Field of Classification Search
USPC .................. 296/83, 105, 107.07, 107.08
See application file for complete search history.

(56) References Cited

U.S. PATENT DOCUMENTS

| | | | |
|---|---|---|---|
| 5,294,167 A | | 3/1994 | Yu |
| 5,678,882 A | | 10/1997 | Hammond |
| 5,709,426 A | * | 1/1998 | DeRees .................... B60J 7/085 |
| | | | 296/135 |
| 6,575,322 B1 | | 6/2003 | Brown, Jr. |
| 6,851,739 B2 | | 2/2005 | Morley |
| 8,297,679 B2 | * | 10/2012 | Held .......................... B60J 5/08 |
| | | | 296/141 |
| 8,608,223 B2 | * | 12/2013 | Taylor ...................... B60J 11/02 |
| | | | 296/136.01 |
| 2005/0001446 A1 | * | 1/2005 | Morley ...................... B60J 1/08 |
| | | | 296/102 |
| 2011/0233959 A1 | | 9/2011 | Cover et al. |

* cited by examiner

SOFT WINDOW STORAGE UNIT AND METHOD

CROSS-REFERENCE TO RELATED APPLICATIONS

This application claims priority to U.S. Provisional Patent Application Ser. No. 62/050,581, entitled "Soft Window Storage Unit and Method," filed on Sep. 15, 2014, which is hereby incorporated by reference for all purposes.

TECHNICAL FIELD

The present disclosure relates to apparatus and methods for storing soft windows of any type of vehicle.

BACKGROUND

Many types of vehicles, including land vehicles, such as Jeeps, and water vehicles, such as boats, include removable soft tops to selectively provide a closed top or an open top for the vehicle.

Soft tops for vehicles also include soft windows that are often zippered into place to allow a user to open or close the soft windows as desired when the soft top is in place.

In some implementations, these soft windows may be completely removed from the soft top. However, when the soft windows are removed, the soft windows need to be properly stored to prevent scratching of the transparent material forming the soft windows.

SUMMARY

The present disclosure relates to apparatus and methods for storing soft windows of any type of vehicle.

In various implementations, a soft window storage unit may comprise a fabric storage roller and a window storage roller mounted to a base or built into a vehicle.

The storage unit may further comprise a soft fabric coupled to and wrapped around the fabric storage roller. The storage unit may optionally include a cover/rotatable lid.

In various implementations, a method of storing a soft window of a vehicle may include unrolling a length of fabric from a fabric storage roller and wrapping at least a portion of the length of fabric onto a window storage roller, and wrapping a soft window around the window storage roller while wrapping the fabric around the window storage roller.

The method may further include wrapping the soft window between layers of fabric into the window storage roller.

The method may further include removing the soft window from storage by wrapping the fabric back onto the fabric storage roller while simultaneously unwrapping the fabric and the soft window from the window storage roller.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

Figure 1:
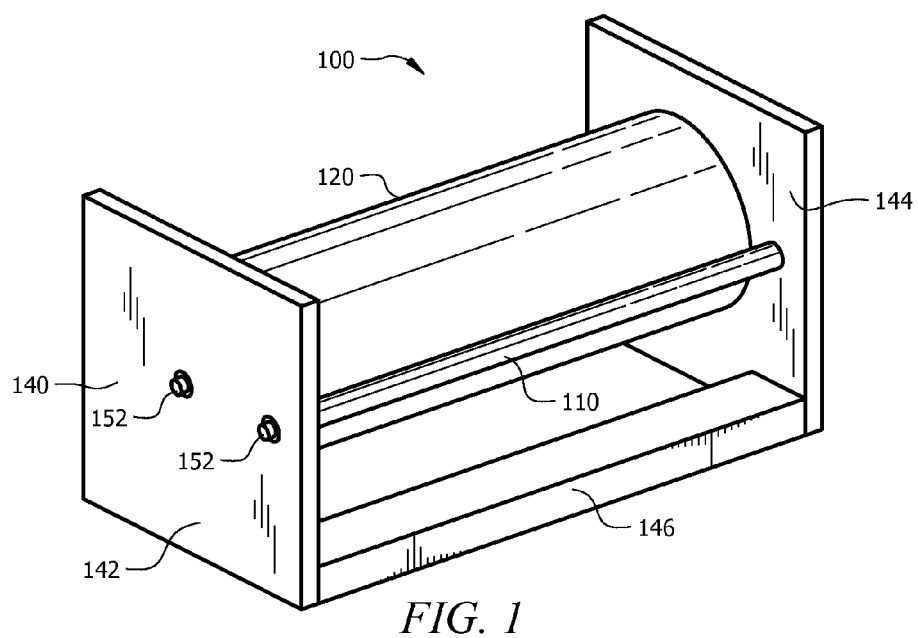
FIG. 1 illustrates a perspective view of an implementation of a soft window storage unit according to the present disclosure.
Figure 2:
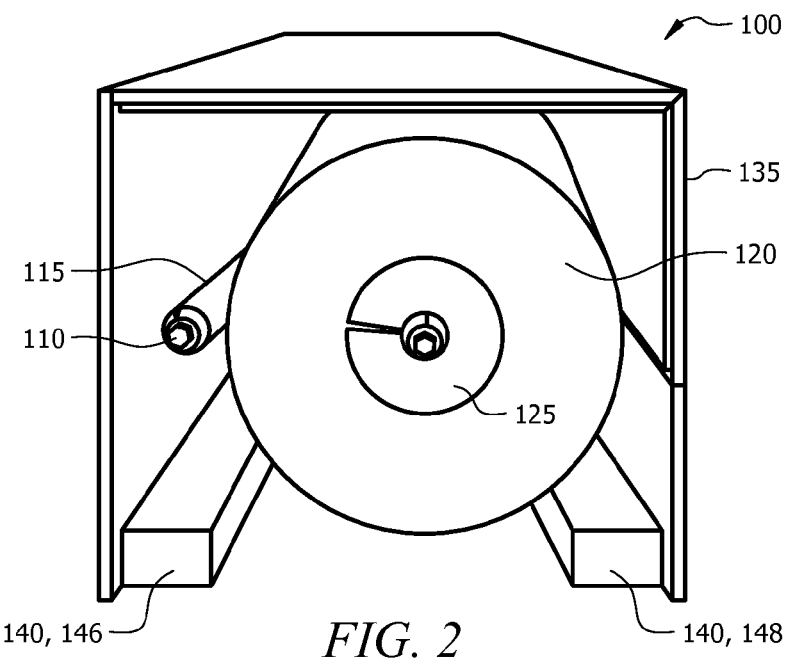
FIG. 2 illustrates a plan end view of an implementation of a soft window storage unit according to the present disclosure.

Referring now to the Figures, FIGS. 1 and 2 depict a storage unit 100 for storing soft windows of any type of vehicle, including land vehicles, such as Jeeps, and water vehicles, such as boats.

The storage unit 100 comprises a fabric storage roller 110 and a window storage roller 120 mounted to a base 140, which may comprise sides 142, 144 and bottom cross members 146, 148. The window storage roller 120 may include a smaller diameter roller portion 122, which may be approximately the same diameter as the fabric storage roller 110, and may be surrounded by a larger diameter roller portion 125 that may be formed of a pliable material, such as a foam core. A soft fabric 115 may be coupled to and wrapped around the fabric storage roller 110.

In some implementations, the base 140 may be equipped with hardware or cutouts to facilitate coupling to a vehicle during transport or during operation of the storage unit 100. In other implementations, instead of being mounted to a separate base 140, the fabric storage roller 110 and the window storage roller 120 may be operatively built directly into a vehicle.

Figure 1A:
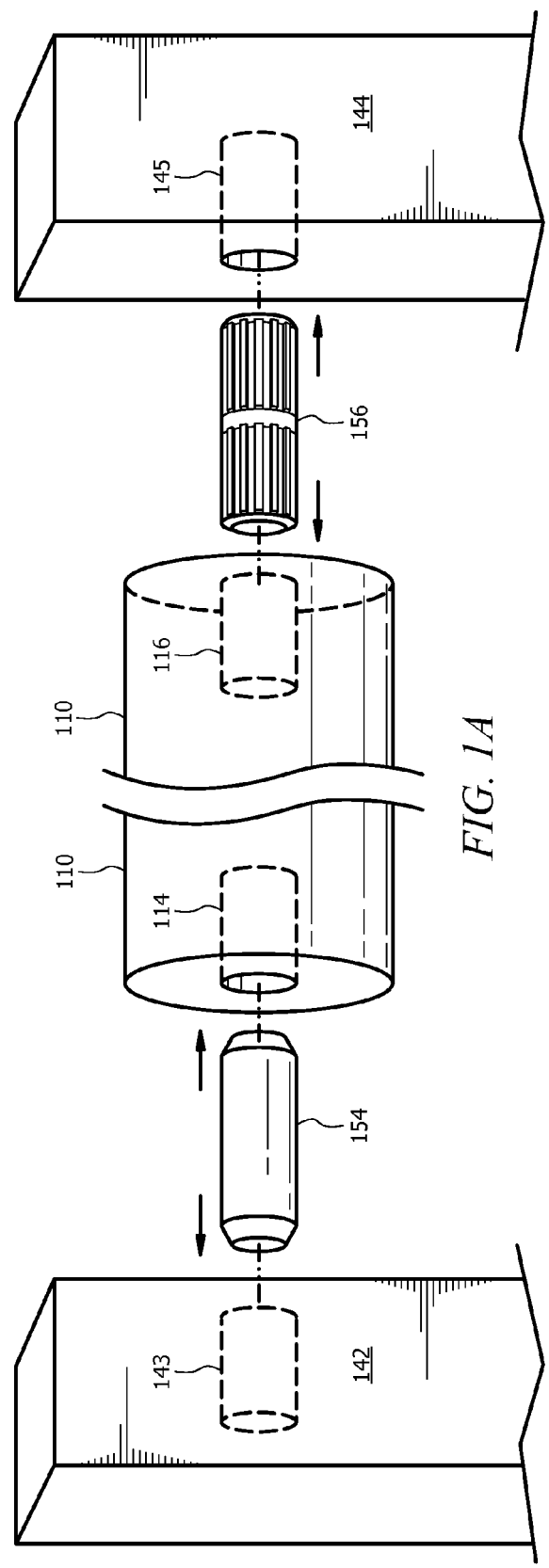
FIG. 1A illustrates a side schematic view of an implementation of a torque connection assembly for a soft window storage unit according to the present disclosure.

The rollers 110, 120 may be mounted to the sides 142, 144 of the base 140 (or directly to a vehicle) by any connection assembly that provides sufficient torque to the rollers 110, 120 to prevent them from inadvertently rotating. FIG. 1 depicts a torque connection assembly comprising hardware 152 that extends through the sides 142, 144 of the base 140 to couple with the rollers 110, 120 in a manner that allows the rollers 110, 120 to rotate with respect to the sides 142, 144. FIG 1A depicts a side schematic view of another torque connection assembly that does not extend through the sides 142, 144 of the base 140. FIG. 1A schematically depicts each end of the fabric storage roller 110 being coupled to the opposing sides 142, 144 of the base 140 via a shelf pin 154 and a torque insert 156, respectively. As shown on the left side of FIG. 1A, one end of the shelf pin 154 is press fit into a bored hole 143 in side 142 of the base 140 and the opposite end of the shelf pin 154 is press fit into a bored hole 114 in roller 110. Similarly, as shown on the right side of FIG. 1A, one end of the torque insert 156 is press fit into a bored hole 145 in side 144 of the base 140 and the opposite end of the torque insert 156 is press fit into a bored hole 116 on the other end of the roller 110. Although not depicted in FIG. 1A, each end of the window storage roller 120 would be similarly coupled to the sides 142, 144 of the base 140 using a shelf pin 154 and a torque insert 156, respectively.

In an implementation, the bored hole 143 in side 142 of the base 140 and the bored hole 114 in the roller 110 may each have a nominal diameter of about 3/16-inch. In an implementation, the shelf pin 154 may have a nominal diameter of about 5 millimeters and a length of about 1-inch. In an implementation, the bored hole 145 in side 144 of the base 140 and the bored hole 116 in the roller 110 may each have a nominal diameter of about 5/16-inch. In an implementation, the torque insert 156 may comprise a TI-300 Series Torque Insert available from Reell Precision Manufacturing, Inc. of St. Paul, Minn., www.reell.com.

Figure 2A:
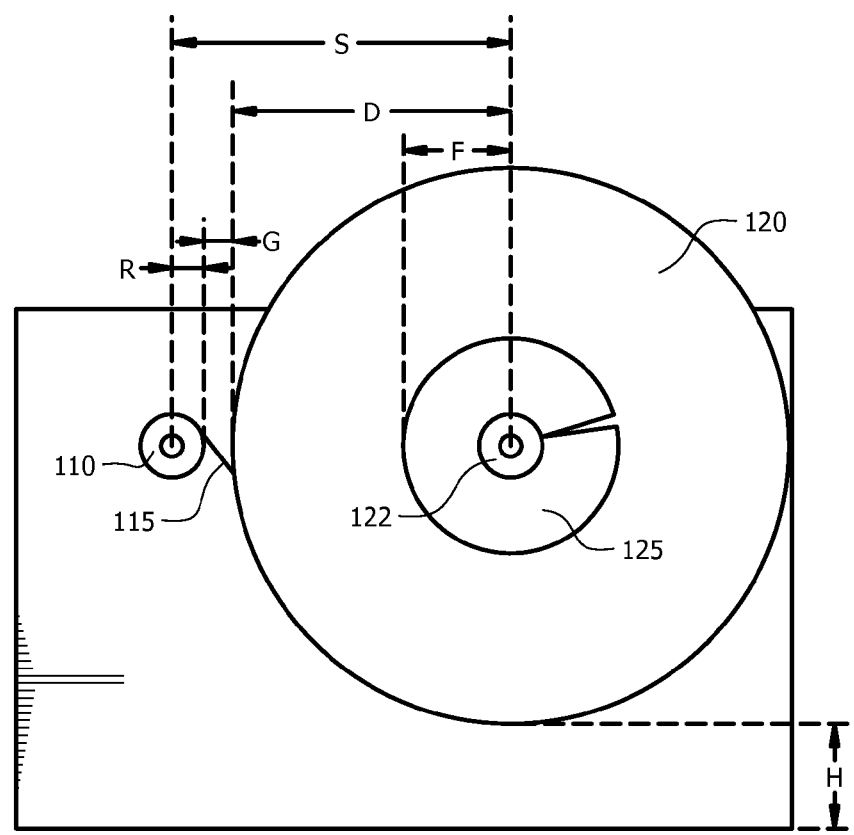
FIG. 2A illustrates a schematic plan end view depicting representative dimensions of an implementation of a soft window storage unit according to the present disclosure.

Referring now to FIG. 2A, which illustrates representative dimensions associated with the rollers 110, 120 of the storage unit 100, the rollers 110, 120 may be mounted in close proximity to one another, but a sufficient gap "G" must be provided therebetween for both rollers 110, 120 to rotate in opposite directions during operation of the storage unit 100. The minimum dimension for gap "G" will depend upon the minimum diameter "R" of the fabric storage roller 110 and the maximum diameter "D" of the window storage roller 120, measured when the window storage roller 120 is at full design capacity. Full design capacity is reached when the total number (i.e. one or more) of soft windows that a given storage unit 100 has been designed to store are wound onto the window storage roller 120, along with the length of fabric 115 from the fabric storage roller 110 required to store that total number of soft window(s). The method of winding soft windows and fabric 115 onto the window storage roller 120 is described in more detail herein with respect to FIGS. 4 and 5.

Once the maximum diameter "D" and the minimum gap "G" dimensions are determined, then the minimum mounting distance "S" between the centerlines of the rollers 110, 120 and the minimum height "H" above the support structure for the storage unit 100 may be established.

Figure 3A:
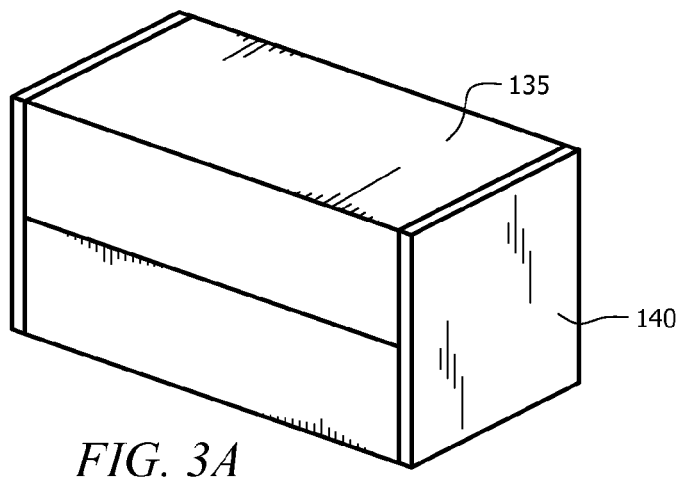
FIG. 3A illustrates the soft window storage unit of FIG. 2 with a cover/rotatable lid of the storage unit in a closed position.
Figure 3B:
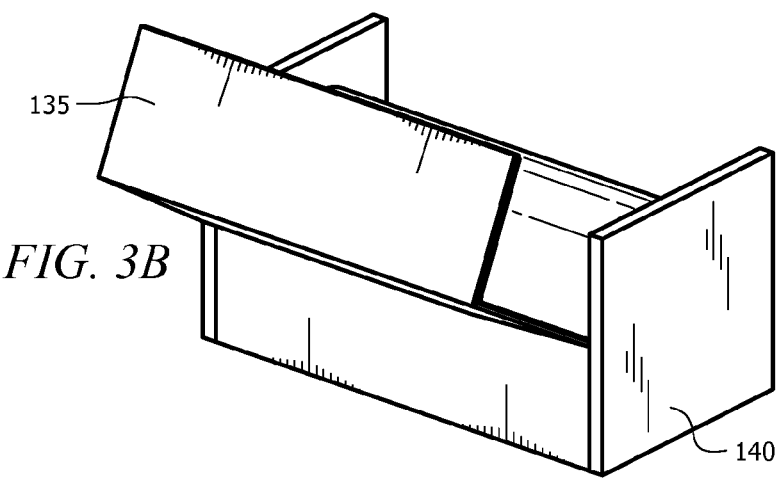
FIG. 3B illustrates the soft window storage unit of FIG. 2 with the cover/rotatable lid of the storage unit as it is being opened.
Figure 3C:
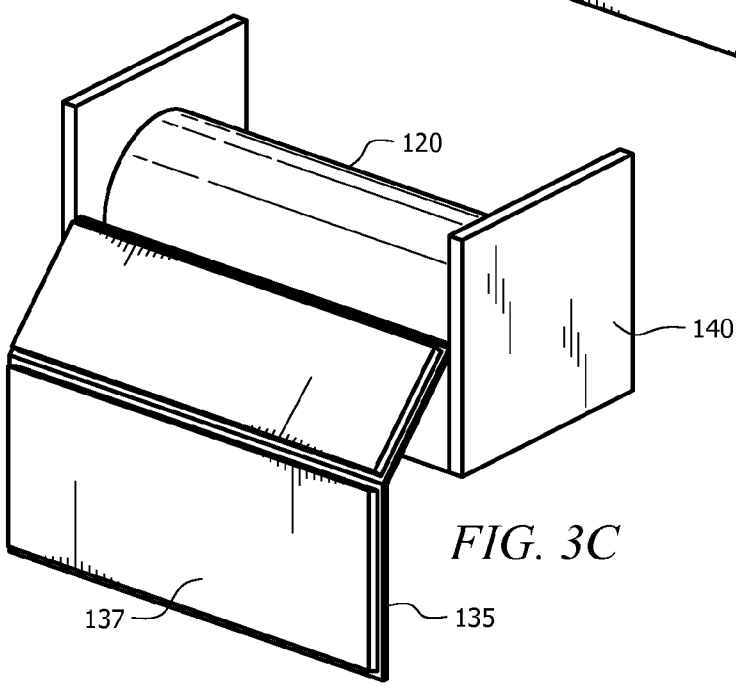
FIG. 3C illustrates the soft window storage device of FIG. 2 with the cover/rotatable lid of the storage unit in a fully opened position.

As shown in FIG. 2 and in FIGS. 3A through 3C, the storage unit 100 may optionally include a cover/rotatable lid 135. The lid 135 is operable to cover the rollers 110, 120 when the storage unit 100 is not in use, as shown in FIG. 3A. The lid 135 may then be rotated open as shown in FIG. 3B to reveal the rollers 110, 120 for operation, as shown in FIG. 3C. A soft material may be provided on the interior surface 137 of the rotatable lid 135 to protect a soft window being rolled onto the window storage roller 120. The rotatable lid 135 may further fold down to extend below the rollers 110, 120 as shown in FIG. 3C, thereby acting as a "slide" for the soft window as it is being rolled onto the window storage roller 120.

It is contemplated that in some circumstances the storage unit 100 may be positioned on a support structure (such as the back of a vehicle with an open hatchback, a bench, a table, etc.) with the lid 135 open and extending down from the support structure (such as over the tailgate of a vehicle, over the edge of a bench or table, etc.). During operation, the user may stand adjacent the support structure, facing the storage unit 100 with the open lid 135 extending down toward the ground.

Figure 4:
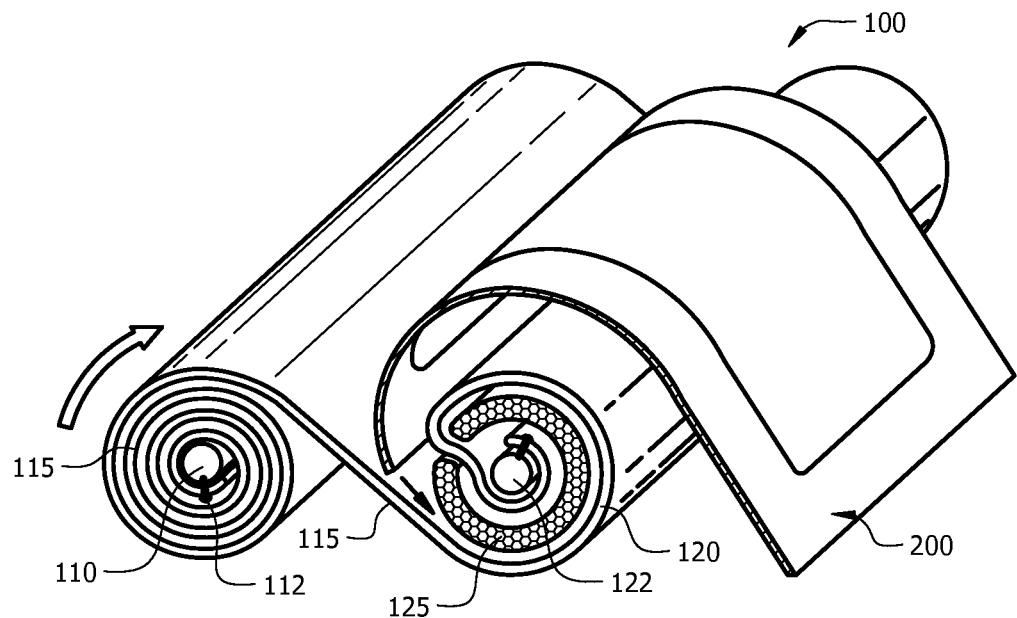
FIG. 4 illustrates an implementation of roller portions of a soft window storage unit in a pre-storage configuration according to the present disclosure, positioned to begin rolling a soft window for storage.
Figure 5:
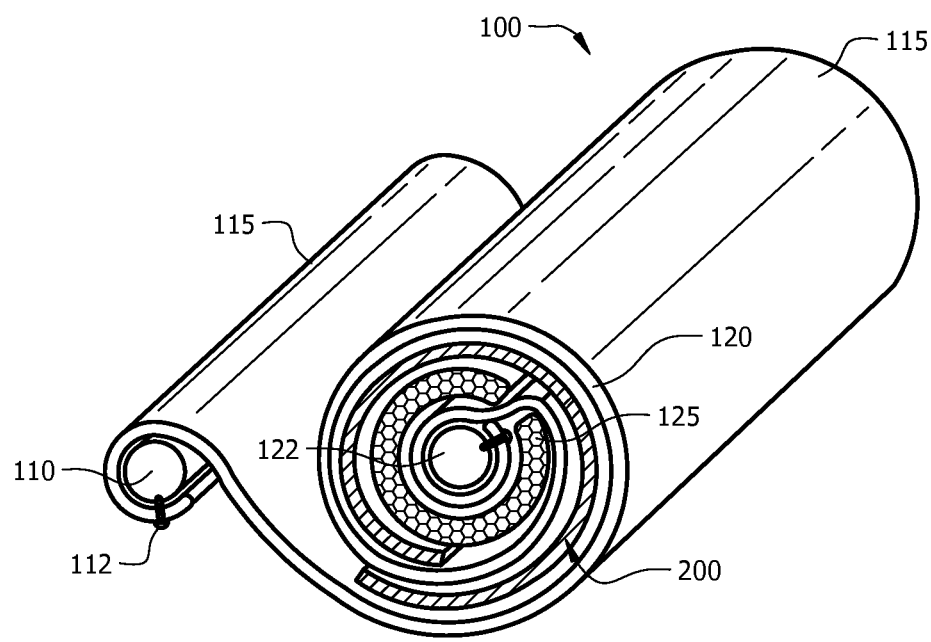
FIG. 5 illustrates the roller portions of the soft window storage unit of FIG. 4 in a storage configuration, after the soft window has been rolled for storage.

FIGS. 4 and 5 depict various views of the rollers 110, 120 of the storage unit 100 in operation. FIG. 4 depicts the rollers 110, 120 when the storage unit 100 is in a pre-storage configuration, and FIG. 5 depicts the rollers 110, 120 when the storage unit 100 is in a storage configuration.

As depicted in FIG. 4, in the pre-storage configuration of the storage unit 100, most of the fabric 115 is wrapped around and secured to the fabric storage roller 110 by a pin 112. However, an end of the fabric 115 extends from the top of the fabric storage roller 110 and wraps underneath and then over the top of the window storage roller 120. This end of the fabric 115 may further extend into the larger diameter roller portion 125, then wrap partially around the smaller diameter roller portion 122 and be coupled thereto by a pin 112.

To store a soft window 200 using the storage unit 100, the user positions a soft window 200 over the top of the window storage roller 120 and begins wrapping the soft window 200 around the window storage roller 120 by rotating counterclockwise.

As the window storage roller 120 rotates counterclockwise, fabric 115 is being wrapped around the window storage roller 120 as fabric 115 is simultaneously unwound from the fabric storage roller 110, which is rotating clockwise. Thus, in this manner, the soft window 200 is wrapped between layers of the fabric 115 as the soft window 200 is also wrapped onto the window storage roller 120.

As depicted in FIG. 5, in the storage configuration of the storage unit 100, the soft window 200 is ultimately wrapped around the window storage roller 120 and between layers of fabric 115 for storage. The fabric 115 may be coupled to the fabric storage roller 110 via a pin 112 to ensure the fabric 115 does not disconnect from the fabric storage roller 110. The larger diameter core 125 of the window storage roller 120 has a diameter (referred to as dimension "F" in FIG. 2A) of sufficient size to ensure that the soft window 200 is not coiled too tightly during storage.

In some implementations, more than one soft window 200 may be wrapped onto the window storage roller 120 at one time. The storage unit 100 may be portable for carrying the storage unit 100 with the soft window(s) 200 stored therein to a location away from the vehicle.

To remove the soft window 200 from storage, the user rotates the fabric storage roller 110 counterclockwise to begin wrapping the fabric 115 back onto that roller 110 while simultaneously the window storage roller 120 is being rotated clockwise to unwrap the fabric 115 and the soft window 200 from that roller 120.

In various implementations of the present disclosure, the dimensions of the rollers 110, 120 and the amount of fabric 115 required to store the soft window(s) 200 will largely depend upon the weight, dimensions and material of the soft windows 200 and the number of soft windows 200 to be stored in a single storage unit 100.

In an implementation, the fabric storage roller 110 may have a nominal length of about 28¼ inches and a nominal diameter of about 1-inch. In an implementation, the window storage roller 120 may have a nominal length of about 28¼ inches, the smaller diameter roller portion 122 may have a nominal diameter of about 1-inch, and the larger diameter roller portion 125 may have a nominal diameter of about 3½ inches. In an implementation, about 15-feet of fabric may initially be wound onto the fabric storage roller 110 and the minimum mounting distance "S" between the centerlines of the rollers 110, 120 may be about 5½ inches.

In an implementation, each of the sides 142, 144 of the base 140 may have a nominal length of about 12½ inches, a nominal height of about 8½ inches and a nominal depth of about ½-inch. In an implementation, each of the cross members 146, 148 of the base 140 may have a nominal length of about 28½ inches and a square cross section of approximately 1½ inches on each side.

In various implementations of the present disclosure, the fabric storage roller 110, the smaller diameter roller portion 122, and/or the base 140 or one or more of its component parts (sides 142, 144, and bottom cross-members 146, 148) may be made of, composed of, coated with, layered with, or otherwise include, for example, wood, laminate, veneer, medium density fiber (MDF) board, particle board, plastic, polyurethane, polyethylene, polyvinyl chloride (PVC), polytetrafluoroethylene (PTFE), steel, aluminum, brass, bronze, stainless steel, another type of metal, synthetic rubber, natural rubber, polymer, other suitable materials, or any combination thereof.

In various implementations of the present disclosure, the soft fabric 115 may be made of, composed of, or otherwise include, any type of fabric that would not scratch or otherwise damage a soft window during rolling and/or storage, including, for example, felt, fleece, microfiber, neoprene, another natural fiber, another synthetic fiber, other suitable materials, or any combination thereof.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A soft window storage unit comprising:
   a fabric storage roller coupled to a structure by a first torque assembly;
   a window storage roller coupled to the structure by a second torque assembly, wherein the window storage roller is disposed substantially parallel to the fabric storage roller; and
   a length of soft fabric coupled to and wrapped around the fabric storage roller in a pre-storage configuration of the soft window storage unit.

2. The storage unit of claim 1:
   wherein the structure comprises two substantially parallel sides.

3. The storage unit of claim 2:
   wherein the fabric storage roller extends between and couples to each of the two substantially parallel sides;
   wherein the window storage roller extends between and couples to each of the two substantially parallel sides; and
   wherein the fabric storage roller and the window storage roller are disposed substantially perpendicular to the two substantially parallel sides.

4. The storage unit of claim 2, further comprising:
   at least one cross-member extending between and coupled to the two substantially parallel sides;
   wherein the at least one cross-member is disposed substantially perpendicular to the two substantially parallel sides.

5. The storage unit of claim 1:
   wherein at least one of the first torque assembly and the second torque assembly comprises a shelf pin, a torque insert, or both.

6. The storage unit of claim 1:
   wherein the window storage roller comprises a smaller diameter roller portion surrounded by a larger diameter roller portion.

7. The storage unit of claim 6:
   wherein the larger diameter roller portion comprises a pliable material.

8. The storage unit of claim 1, further comprising:
   a rotatable cover.

9. The storage unit of claim 8:
   wherein an interior surface of the rotatable cover is coated with a soft material.

10. The storage unit of claim 1:
    wherein at least a portion of the length of soft fabric is unwrapped from the fabric storage roller and wrapped around the window storage roller in a storage configuration of the soft window storage unit.

11. The storage unit of claim 10:
    wherein a minimum mounting distance is provided between a centerline of the fabric storage roller and a centerline of the window storage roller; and
    wherein the minimum mounting distance provides a minimum gap between the fabric storage roller and the window storage roller in the storage configuration of the soft window storage unit.

12. The storage unit of claim 11:
    wherein the minimum gap allows the fabric storage roller and the window storage roller to rotate in opposite directions during transition from the pre-storage configuration to the storage configuration of the soft window storage unit.

13. The storage unit of claim 1:
    wherein the structure comprises a base; and
    wherein the soft window storage unit is portable.

14. The storage unit of claim 1:
    wherein the structure comprises a vehicle; and
    wherein the soft window storage unit is built into the vehicle.

15. A soft window storage unit comprising:
    a base comprising a first side, a second side substantially parallel to the first side, and at least one cross-member extending between the first side and the second side and coupled thereto;
    a fabric storage roller coupled to the first side by a shelf pin and coupled to the second side by a torque insert;
    a window storage roller coupled to the first side by a shelf pin and coupled to the second side by a torque insert, wherein the window storage roller is disposed substantially parallel to the fabric storage roller; and a length of soft fabric coupled to and wrapped around the fabric storage roller in a pre-storage configuration of the soft window storage unit.

16. The storage unit of claim 15:
wherein at least a portion of the length of soft fabric is unwrapped from the fabric storage roller and wrapped around the window storage roller in a storage configuration of the soft window storage unit.

17. A method of storing a soft window of a vehicle comprising:
unrolling a length of fabric from a fabric storage roller;
wrapping at least a portion of the length of fabric onto a window storage roller; and
wrapping a soft window around the window storage roller while wrapping the fabric around the window storage roller.

18. The method of claim 17, wherein the soft window is wrapped between layers of fabric onto the window storage roller.

19. The method of claim 17, further comprising removing the soft window from storage.

20. The method of claim 19, wherein removing the soft window from storage comprises:
wrapping the fabric back onto the fabric storage roller while simultaneously unwrapping the fabric and the soft window from the window storage roller.

* * * * *